Patented Nov. 3, 1925.

1,560,472

UNITED STATES PATENT OFFICE.

CARLOS D. HOPPES, OF ASHLAND, OHIO, ASSIGNOR TO THE FAULTLESS RUBBER COMPANY, OF ASHLAND, OHIO A CORPORATION OF OHIO.

ORNAMENTATION.

No Drawing.   Application filed October 20, 1924.   Serial No. 744,843.

*To all whom it may concern:*

Be it known that I, CARLOS D. HOPPES, a citizen of the United States of America, and a resident of Ashland, in the county of Ashland and State of Ohio, have invented certain new and useful Improvements in Ornamentation, of which the following is a full, clear, and exact description.

My invention relates to ornamentation and the principal object of my invention is to provide a new and improved process of ornamentation. In this application I have described, for purposes of illustration, one method embodying my invention and have chosen for that method a method particularly suited to the ornamentation of sponge rubber balls.

In carrying out the herein described process I form a sponge rubber ball in any suitable manner and then dip this ball into a rubber cement of any suitable color and lustre. Then, before this cement has appreciably set, and preferably while the excess cement is still dripping from the ball, I spray onto portions of the surface of the ball one or more rubber cements of a color or lustre differing from that of the cement in which the ball was dipped to thus produce on the ball a mottled effect resulting from the alternating patches or streaks of different appearing cements. The various cements are then cured in this condition and in any suitable manner.

It will be obvious to those skilled in the art that the above process will produce a beautifully mottled ball at a decidedly low cost. It will also be obvious that the cement may be applied to an uncured ball and cured simultaneously with the ball, that the process may be used to ornament articles other than rubber balls, that the ornamenting material may be other than rubber cements of different appearances, that the ornamenting material may be applied otherwise than by dipping the entire surface in one material and then spraying on the other contrasting materials, that the coatings may differ in any manner desired and may be of any desired number and applied in any desired order or even simultaneously, and that in general the particular process herein described may be variously changed and modified without departing from the spirit of my invention or sacrificing the advantages thereof. It will therefore be understood that this disclosure is illustrative only and that my invention is not limited thereto.

I claim:

The method of ornamenting a rubber surface which comprises applying fluid rubber to said surface, then, before said fluid rubber has set, and while said fluid rubber is still in condition to blend, squirting onto said surface, in overlapping relation to said first fluid rubber, additional fluid rubber of contrasting appearance adapted to at least in part blend with said first fluid rubber, and finally setting said fluid rubbers by effecting vulcanization thereof.

In testimony whereof, I hereunto affix my signature.

CARLOS D. HOPPES.